Feb. 16, 1926.

H. C. KARSTENS

OIL TUBE FOR MOTOR VEHICLES

Filed March 24, 1924

1,572,934

Witnesses:

Inventor:
Henry C. Karstens

Patented Feb. 16, 1926.

1,572,934

UNITED STATES PATENT OFFICE.

HENRY C. KARSTENS, OF SHELBY COUNTY, NEAR AVOCA, IOWA.

OIL TUBE FOR MOTOR VEHICLES.

Application filed March 24, 1924. Serial No. 701,435.

*To all whom it may concern:*

Be it known that I, HENRY C. KARSTENS, a citizen of the United States, and a resident of Shelby County, in the State of Iowa, near the town of Avoca, county of Pottawattamie, and State of Iowa, have invented certain new and useful Improvements in Oil Tubes for Motor Vehicles, of which the following is a specification.

My invention relates to new and useful improvements in oil tubes for motor vehicles such as automobiles, trucks, tractors, and the like; and has for its object the provision of an improved oil tube for the crank case of such a motor vehicle, which tube is provided with means for readily cleaning it out by the application of a compressed air hose to said means at the outside of said crank case.

In a popular make of motor vehicle an oil tube is generally mounted in the crank case to transfer oil from the rear of said crank case to the front thereof. This tube becomes clogged from the constant flow of oil therethrough, and in order to clean it the crank case must be opened to provide access to said tube, and this opening of the crank case involves time and labor. It is my object and purpose to provide the oil tube with means, preferably in the form of a pipe extending from said tube through the wall of the crank case and arranged at its exterior end for convenient attachment to an air hose, so that the tube may be speedily blown out and thoroughly cleaned at frequent intervals, and without involving substantially any time or labor; and also to provide a cut-off valve in said tube, which is operable from the exterior of the crank case, to enable the separate blowing-out of the most frequently clogged upper part of said tube.

Other objects will appear hereinafter.

The invention consists in the combinations and arrangement of parts hereinafter described and claimed.

Figure 1:
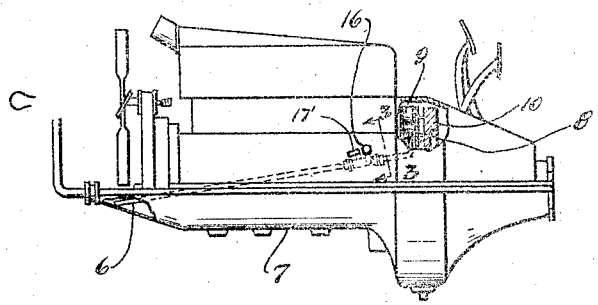
Figure 2:
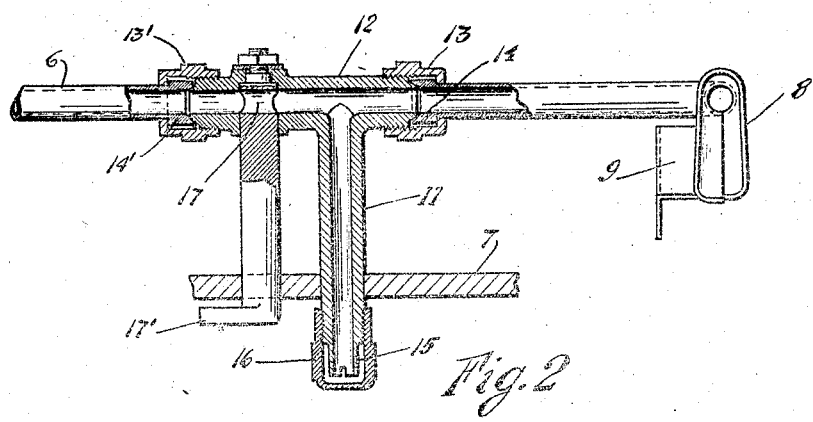
Figure 3:
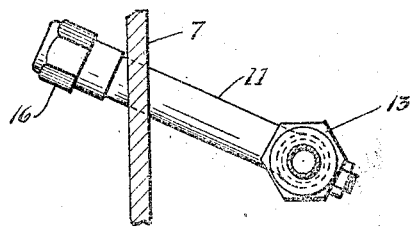

The invention will be best understood by reference to the accompanying drawing, forming a part of this specification, and in which Fig. 1 is a side view of the crank case of a well-known type of motor vehicle with my invention applied thereto;

Fig. 2 is an enlarged fragmentary plan view of my invention, partly in section, and Fig. 3 is an enlarged cross sectional view taken on line 3—3 of Fig. 1.

In the drawing I have shown my improved oil transferring tube 6 mounted in position in the crank case 7 of a well-known type of motor vehicle. The receiving cup 8 on said tube is mounted in the usual position on the magneto 9, adjacent the fly wheel 10, to receive the oil carried upward by said fly wheel, and the lower or discharge end of said tube extends downwardly to the forward end of the crank case.

This oil tube I provide with means for introducing air into its interior from the outside of the crank case. This means, as illustrated in the drawing, preferably includes a stem or pipe 11 which is connected with the tube 6, communicating with the interior thereof, and which extends upwardly through the wall of the crank case and is mounted with a close fit in said wall. The connection of said pipe with said tube is preferably made by providing the pipe with a T-head 12 which is interposed in the tube 6, being preferably releasably connected by means of a coupling sleeve 13 with the end 14 of the upper part of said tube, and by a similar coupling sleeve 13' with the end 14' of the lower part of said tube. The outer end of pipe 11 is provided with a reduced end or tip 15, or is similarly arranged for convenient attachment to the usual compressed air hose accessible at all garages. A cap 16 is normally threaded over said tip end to prevent entrance of dust, etc., and a cut-off valve 17 with a handle 17' is mounted in said tube to be closed for separately blowing out the upper part or funnel part which is most liable to become clogged.

The air introducing means or pipe and the valve may be interposed in the tube 6 which is already installed in the automobile, or a suitable tube may be especially constructed and include the pipe 11 and the cut-off valve 17 for introducing the air into the tube from the exterior of the crank case, and said tube with pipe and valve may be installed in place of the customary oil transferring tube at present used in said crank case; and in either case the pipe or air introducing means is extended through the crank case and arranged for attachment to a compressed air hose at the exterior of said case, and the handle 17' of said valve is likewise extended through said case.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. An oil tube for a crank case comprising a member having a T-head interposed in said tube and having coupling sleeves for removably mounting said member in said tube, an integral branch pipe extending from said T-head and having its outer end arranged for attachment to an air hose, covering means on the outer end of said pipe, and a cut off valve mounted in said member at one side of said branch pipe and having a handle outside of said crank case to direct all air through said pipe in one direction through said tube.

2. An oil tube for an automobile crank case, having an upper receiving part and a lower discharge part and having a T-head interposed therein by means of coupling sleeves for removably mounting it in said tube, an integral branch pipe extending transversely from said T-head outward of said crank case and having its outer end arranged for attachment to an air hose, a covering cap threaded over said outer end, and a cut-off valve mounted in said T-head at the lower side of said branch pipe and extending to the outside of said crank case for convenient operation thereof and to direct all air through said pipe and tube in the direction of the receiving end.

In testimony whereof I have signed my name to this specification.

HENRY C. KARSTENS.